Patented Aug. 25, 1925.

1,550,951

UNITED STATES PATENT OFFICE.

JOHN B. DAILEY, OF DETROIT, MICHIGAN, ASSIGNOR TO GENERAL MOTORS CORPORATION, OF DETROIT, MICHIGAN, A CORPORATION OF DELAWARE.

WELDING.

No Drawing. Application filed August 17, 1923. Serial No. 657,937.

*To all whom it may concern:*

Be it known that I, JOHN B. DAILEY, a citizen of the United States, and a resident of Detroit, county of Wayne, and State of Michigan, have invented certain new and useful Improvements in Welding, of which the following is a full, clear, concise, and exact description, such as will enable others skilled in the art to which the invention relates to make and use the same, reference being made therein to the accompanying drawings, which form a part of this specification.

This invention relates to simultaneously hardening and welding high speed steel, and will be described as carried out in hardening a piece of high speed steel intended to form the cutting edge of a tool, and simultaneously welding it to a piece of low carbon steel which forms the body of the tool.

An object of the invention is to simplify the manufacture of tools of this character by performing the welding and hardening operations at the same time. According to the present invention, this may be accomplished by heating the joint to a temperature which prepares the high speed steel for hardening or tempering and which temperature also causes the high speed steel to weld properly to the body of the tool, and then quenching the joint suddenly in a tempering fluid which completes the hardening of the high speed steel portion.

As one manner of carrying out this method, the high speed steel is placed in position against a piece of other steel, such as low carbon or cold rolled steel, and the joint between them is coated with a brazing mixture, preferably a mixture melting at the described temperature, as, for example, one composed of approximately equal parts by weight of copper powder and borax. The parts are then clamped together and placed in a furnace, which is brought to a temperature of approximately 2150 to 2200° F., after which the tool is removed and quenched in oil. It will be observed that two operations have in this manner been carried out simultaneously. The weld between the parts has been made, and the tip of the tool, i. e. the high speed steel, has been tempered or hardened.

While one range of temperatures and one particular mixture have been specified, it is not my intention to limit the scope of the invention to those particular temperatures or that particular mixture, or otherwise than by the terms of the appended claim.

I claim:

That method of joining together low carbon steel and high speed steel and simultaneously hardening the high speed steel which comprises coating the joint between the high speed steel and the low carbon steel with a mixture composed of approximately equal parts by weight of copper powder and borax, heating the joint until the mixture melts and the steels are joined together, and then quenching the joint and simultaneously hardening the high speed steel by immersing the weld and the high speed steel in a tempering fluid.

In testimony whereof I affix my signature.

JOHN B. DAILEY.